July 18, 1950          J. ORNFELT          2,515,730
COFFEE EXTRACTION PROCESS
Filed Oct. 24, 1947
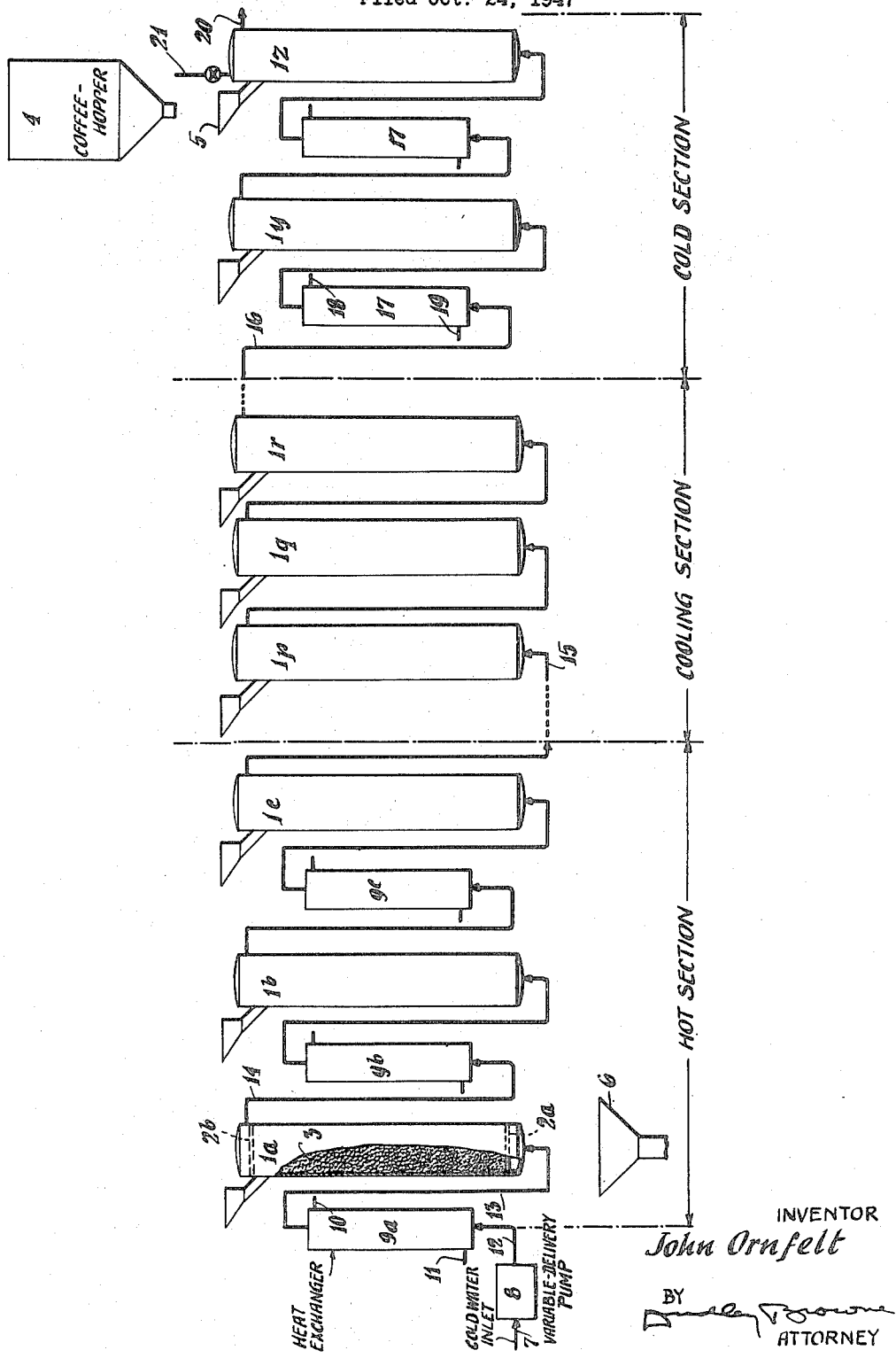
INVENTOR
John Ornfelt
BY
ATTORNEY

Patented July 18, 1950

2,515,730

UNITED STATES PATENT OFFICE 2,515,730

COFFEE EXTRACTION PROCESS

John Ornfelt, Morristown, N. J., assignor, by mesne assignments, to American Home Foods, Inc., New York, N. Y., a corporation of New Jersey Application October 24, 1947, Serial No. 781,787

8 Claims. (Cl. 99—71)

This invention relates to a coffee extraction process adapted to produce a highly concentrated extract of good flavor and aroma, which may be sold as such or may be further processed to produce a dry powdered coffee extract. So-called "instant coffee" have been a popular article of commerce for many years in spite of the fact that they have had less satisfactory flavor and aroma than the best freshly brewed coffee. Continuous efforts have been made in the industry to improve the flavor and aroma of such products and simultaneously to increase the yield of coffee extract from the coffee bean.

Such extracts have in general been made by extracting ground roasted coffee with hot water and concentrating or drying the resultant extract. Spray drying has been the preferred drying method because of its rapidity, but various vacuum drying methods have also been applied. Alternatively, the liquid extract has been concentrated, bottled, and sold in this form.

It is known that by raising the temperature of the extracting water—e. g. to 160° C. or above—a high yield of soluble matter can be obtained from a given weight of ground roasted coffee. The effect of high temperature extraction is to cause a hydrolysis of coffee material and to convert a considerable fraction of it from an insoluble to a soluble form. Treatment of the coffee, however, with water at excessively high temperatures introduces into the final extract products having an unpleasant, acrid, empyreumatic flavor and aroma. I have found that a moderate amount of solubilization at temperatures which are not excessive not only improves the yield of extract but actually improves its flavor. Whereas extraction in the usual way with water at 100° C. or slightly below will remove normally not more than 20 percent of the weight of the roasted coffee as soluble extract, and in the case of the best grades of coffee with most efficient extraction not more than 25 per cent, extraction by water under superatmospheric pressure at 160° C. or higher can be made to remove as much as 50 or 55 percent of the weight of the ground roasted coffee as soluble extract.

The coffee manufacturer is thus faced with the problem of securing as high a yield as possible from his starting material without producing a product of undesirable flavor and aroma.

If freshly roasted coffee is extracted with water or a weak coffee infusion at temperatures varying from room temperature up to 100° C., the infusion obtained is subject to ready deterioration because the aroma- and taste-producing compounds are subject to break-down by hydrolysis and oxidation on contact with the air (a different reaction from the high-temperature hydrolysis referred to above). By extracting the freshly roasted coffee, however, with a liquid coffee extract containing a relatively high concentration of coffee solubles—e. g. 35 percent or more—hydrolysis of the aroma- and taste-producing substances is retarded. The production of such highly concentrated infusions involves relatively extensive contact of the aqueous extraction medium with the coffee, which in itself involves the possibility of the destruction or deterioration of the flavor and aroma unless certain precautions are carefully observed.

I have discovered that by a combination of operating steps, disclosed below, it is possible to obtain a 28–40 percent yield by weight (based on the weight of fresh ground roasted coffee treated) of coffee solubles of desirable aroma and taste in the form of a highly concentrated aqueous extract which may be sold as such, may be further concentrated for sale as a liquid extract, or may be dried (as by spray drying) to produce a solid soluble coffee extract. In the latter case the high concentration of the liquid infusion produced by my process has a double advantage: it greatly reduces the cost of the drying operation because of its relatively small water content and also favors the production of a dry product of good flavor and aroma because of the short duration of the drying step resulting from its low water content.

According to my process, I extract ground roasted coffee in a plurality of stages; in the initial stages I use hot water under pressure in the temperature range of 125°–150° C.; in the intermediate stages I allow the infusion to cool down progressively to a temperature preferably of approximately 40° C.; and finally I use the resulting effluent to extract coffee in the temperature range of approximately 25°–15° C. The hot water in passing through these extraction stages is made to contact progressively less exhausted coffee; on its introduction into the extraction train it is brought into contact with nearly exhausted coffee, and prior to its exit from the train, i. e. in the above noted low temperature range, it is contacted with unextracted ground roasted coffee. Throughout the operation the extraction is effected at all stages in the substantial absence of air, and the extract on leaving the train is preferably bottled at once or run directly to a drier to avoid as far as possible contact with the air in the presence of a substantial amount of water.

In my process the infusion becomes progressively more concentrated as it moves through the extraction train. I have found it desirable to use a rate of flow such that on emergence from the high temperature section of the extraction it has a concentration in the range 8–12 percent of solids by weight, and just prior to entering the final percolators at the cold end of the extraction train it has a concentration of at least 35 percent by weight of solids, so that a final extract is obtained having a minimum concentration of 40 percent of soluble coffee solids and preferably of 50 percent or more.

In order to further illustrate my process, a preferred method of operation will be described in connection with the attached drawing which illustrates in conventional diagrammatic form one embodiment of apparatus which I may use. The description and drawing are intended to be exemplary only, and not to limit the scope of my invention, which is defined in the attached claims.

In the drawing, the percolators are indicated at $1a$, $1b$, $1c$ ... $1p$, $1q$, $1r$ ... $1y$, $1z$, the initial percolator $1a$ being shown partly in section. Each percolator is provided at its bottom with a bottom screen $2a$ and a top screen $2b$ of sufficient fineness to prevent coffee from passing through but being readily permeable to water. A charge of ground roasted coffee $3$ is supported on screen $2a$. It is desirable, but not essential, that the coffee nearly fill the percolator. The coffee may be introduced from a hopper $4$ through manhole $5$. The hopper may be movably mounted so that it can be brought successively over any desired percolator. Each percolator is constructed with a bottom outlet of any well-known design so that the exhausted coffee may be discharged into a suitable chute $6$ and any desired disposition thereof made. Cold water is fed to the system from water-main $7$, and is pumped to the extraction train by variable-delivery pump $8$. In the hot section of the extraction train a series of heat exchangers $9a$, $9b$, $9c$ ... is provided in series with the percolators, as shown. Each heat exchanger is provided with a live steam inlet $10$ and outlet $11$. Extraction water passes through suitable piping $12$ from the variable delivery pump through heat exchanger $9a$, where it is heated to a temperature between 125° and 150° C., preferably approximately 150°, and at this temperature passes through pipe $13$ into the bottom of the initial percolator $1a$. The percolators are insulated, but some drop in temperature occurs as the water passes through them. This drop is made good by the supply of additional heat to the weak infusion passing from the top of the initial percolator through pipe $14$ by passage through the second heat exchanger $9b$ before introduction into the bottom of the succeeding percolator $1b$.

In practical operation I have found it desirable to conduct the extraction in a series of 12 to 16 percolators, in which case the hot section desirably consists of 4–7 percolators with associated heat exchangers. On leaving the hot section the infusion passes through pipe $15$ into the bottom of the first percolator $1p$ of the cooling section, upwards through the coffee in that percolator, out of the top of the percolator, and so, successively, through the percolators in this section, which may advantageously number 5–8. No heat is introduced into the circulating infusion in this section, and the temperature is allowed to fall gradually below 50° C., e. g. to approximately 40° C. On leaving the last percolator in the cooling section by pipe $16$, the infusion is passed through a heat exchanger $17$ provided with cold water inlet $18$ and outlet $19$, in which it is cooled substantially below room temperature, e. g. to approximately 15° C. It is led from this heat exchanger through pipe $19$ into the first percolator of the cold section, thence through another heat exchanger in which it is cooled again to approximately 15° C., and thence to the final percolator, from which it is discharged for further prompt processing as desired through pipe $20$. The cold section advantageously comprises 2–4 percolators.

For the sake of clarity, only sufficient piping and only a sufficient number of heat exchangers have been shown in the drawing to carry out one complete cycle of extraction. In actual practice, however, and for the purposes of continuous operation, a heat exchanger having both steam and cold-water connections is provided for each percolator and such piping connections and valves are provided that any heat exchanger may be bypassed. Connections and valves are also provided so that any one of the percolators may serve as the initial percolator and any one as the final percolator, and so that intermediate percolators may be fed with infusion in the desired order and may be operated either hot or cold or with spontaneous cooling, as desired. Since such piping systems form no part of this invention and are well known in the chemical engineering art, further detailed description and illustration are believed to be unnecessary.

In starting up a system such as that above described, the percolators must, of course, be initially charged with fresh ground roasted coffee. After a steady state of continuous operation has been reached, however, the following procedure is followed: When the coffee in the initial percolator $1a$ has become exhausted, circulation of infusion is halted, this percolator is cut out of the circulating system by suitable manipulation of valves, and its contents is dumped. An additional percolator, previously charged with fresh ground roasted coffee from hopper $4$ through manhole $5$, is connected to the exit end of the system and circulation of infusion is resumed, cold concentrated infusion being thus introduced gradually into the bottom of the freshly charged percolator. As the liquid rises in the percolator, air is vented through pipe $21$ until it has all been displaced. Carbon dioxide gas is evolved by the coffee as the particles become wetted, and this gas forms a cushion between the upper surface of the rising infusion in the percolator and the air above it. Analysis has shown that when a percolator has been about two-thirds filled with infusion the gas above the liquid contains 80 to 85 percent $CO_2$. When the air has been expelled from the percolator, the valve in vent $21$ is closed and extraction proceeds in the normal way, the freshly charged percolator becoming the final unit in the extraction train. It is fed with highly concentrated infusion at a temperature between 25° and 15° C., and delivers the finished product. The original initial percolator $1a$ having been removed from the system and emptied, the original second percolator $1b$ becomes the new initial percolator, and so on progressively through the system, the circulating water picking up more and more solubles from the coffee and coming progressively into contact with less and less exhausted coffee.

As an example of my operations I have obtained excellent results in operating such a system consisting of 14 percolators 6 in the hot section, 6 in the intermediate cooling section, and 2 in the cold section. I charge each percolator in turn as above described with 1000 pounds of fresh ground roasted coffee, introduce water into the initial percolator at approximately 150° C., and maintain it at or near this temperature during its passage through the hot section. I regulate the rate of input flow at approximately 100 gallons per hour, and produce an infusion as it leaves the hot section containing 8–12 percent soluble solids. On its exit from the intermediate cooling section, the infusion will have picked up sufficient additional soluble solid material to bring its concentration up to nearly 35 percent or more as it enters the cold section, and on leaving the cold section it will contain from 40 to 50 percent by weight of solid soluble coffee material. The extraction cycle lasts 3 to 4 hours, at the end of which period an exhausted percolator is shunted out and a freshly charged percolator shunted into the train. I have found that in operating this way and not appreciably exceeding a temperature of 150° C. I obtain a yield of 32 to 36 percent by weight of the soluble solids contained in the coffee subjected to extraction without introducing unacceptable acrid empyreumatic flavor- and aroma-producing material into the extract. I attribute this largely to the fact that the high concentration of the extract used to extract fresh coffee at the cold end of my extraction train tends to inhibit hydrolysis of the desirable material, to the fact that such a concentrated extract is a better solvent for the desirable aroma- and flavor-producing materials than is a weak infusion, to the rigid exclusion of air throughout my extraction process, and to the low temperature at which the final extraction is effected and at which the final infusion leaves the extraction train.

By regulating the input of hot water into an extraction train such as that described at a rate of 100 gal./hr. and observing the disclosed temperature limitations, I have been able to obtain extracts of excellent flavor and aroma having a soluble concentration of approximately 40–50 percent by weight and containing in the neighborhood of a 40 percent yield based on the weight of ground roasted coffee treated, i. e. each 1000 pounds of coffee will yield approximately 900 pounds of concentrate containing approximately 400 pounds of soluble solids and 500 pounds (60 gallons) of water. The specific gravity of such an infusion is subject to some variation with different grades of coffee and different degrees of roasts, but usually lies in the range $$1.21 \text{ to } 1.22 \frac{20°}{20°} C.$$

for a 45 percent concentration. The volume of 900 pounds of such an infusion is thus approximately 90 gallons.

Of the 350 odd gallons of water introduced into the extraction system during a 3½ hour cycle, the balance not recovered as infusion at the cold end is discharged from the system with the exhausted grounds. Since this liquid contains only a fraction of a percent of solubles of low taste value, it may be discarded.

As will be clear from the preceding description to those skilled in the extraction art, numerous changes may be made in my method and the associated apparatus without departing from my invention. For example the size, shape and number of percolators used and the rate of flow of infusion may be varied, depending on output desired, area and height available for the equipment, and similar practical considerations. My process is, however, not a simple extraction, but a combination of extraction and controlled conversion of insoluble coffee material to soluble material by hydrolysis at a regulated high temperature; it also involves use of conditions which ensure maintenance of taste and aroma in the end product. It is essential, therefore, to operate within the temperature ranges indicated and to provide a degree of contact under those conditions which will result in the production of an infusion containing at least 40 percent by weight of soluble coffee extract. It is highly desirable for this purpose that contact of coffee and infusion should be so regulated as to attain intermediate infusion concentrations, i. e. at the outlets of the hot section and the intermediate cooling section, within the limits indicated.

If the process is so regulated as to produce too high an extraction at the hot end of the system, higher yields may be obtained but the quality of the final product will suffer. An overall yield of coffee solubles representing 40 percent of the weight of the fresh ground roasted coffee treated is the maximum I have been able to obtain without undue sacrifice of quality; some of the advantages of my process may be realized with yields as low as 28 percent. Associated with this range of yields, extract concentrations from 40 to 50 and even 55 percent by weight of coffee solubles are obtainable and desirable.

I claim:

1. In a coffee extraction process in which ground roasted coffee is extracted in a series of stages with water at an elevated temperature in the range of 125°–150° C. to produce a highly concentrated coffee extract, the further step of using said extract in the approximate temperature range 25°–15° C. to extract unextracted ground roasted coffee.

2. In a coffee extraction process in which a highly concentrated coffee infusion of soluble unoxidized partially heat-hydrolyzed coffee solids has been produced by extracting ground roasted coffee in a series of stages with water in the temperature range 125°–150° C., the steps which comprise: passing said infusion into contact with unextracted ground roasted coffee at a temperature within the approximate range 25°–15° C. until it contains in solution at least 40 percent by weight of coffee solids, air being substantially excluded from access to the infusion and to the coffee during said contact, separating the resulting infusion from the partially extracted coffee, and further extracting the partially extracted coffee with water in the range 125°–150° C.

3. In a process for preparing a concentrated aqueous infusion of ground roasted coffee adapted to be used for the preparation of a concentrated soluble coffee product, in which process hot water is passed serially through a plurality of percolators containing ground roasted coffee in a series of progressively less exhausted stages of extraction in the direction of travel of the water, the steps which comprise: initially extracting partially exhausted coffee with water at 125°–150° C., using resultant effluent to extract less exhausted coffee at descending temperatures in the range 125°–25°, the volume of water and time of extraction being so regulated as to produce an effluent containing at least 35 percent by weight of coffee solids, and finally using said resultant effluent at approximately 15°–25° C. and containing at least 35 percent by weight of coffee solids to extract unextracted coffee, the contact of liquid with coffee in all stages of the extraction being effected in the substantial absence of air.

4. In a process for preparing a concentrated aqueous infusion of ground roasted coffee adapted to be used for the preparation of a concentrated soluble coffee product, in which process hot water is passed serially through a plurality of percolators containing ground roasted coffee in a series of processively less exhausted stages of extraction in the direction of travel of the water, the steps which comprise: passing water at 125°–150° C. through a closed percolator containing nearly exhausted coffee to produce a weak coffee extract, passing the resulting extract serially through further closed percolators containing less exhausted coffee while maintaining the temperature of the extract in the range 125°–150° C. by passage through heat exchangers between passages through percolators, thereby building up the strength of the extract, passing the resulting extract serially through additional closed percolators containing partially extracted coffee while permitting the extract to cool to a temperature substantially about 25° C., the volume of water and time of extraction being so regulated as to produce an effluent containing at least 35 percent by weight of coffee solids, then cooling said effluent containing at least 35 percent by weight of coffee solids to a temperature within the range 25°–15° C. and passing it through a closed percolator containing unextracted ground roasted coffee, the contact of coffee with liquid in all stages of the extraction being effected in the substantial absence of air and in later stages of the extraction under a substantial partial pressure of carbon dioxide.

5. The process as defined in claim 4, in which the rate of flow of water is so regulated as to produce a final extract containing at least 40 percent by weight of soluble coffee solids.

6. The process as defined in claim 4, in which fresh coffee is intermittently added at the outlet end and exhausted coffee intermittently removed from the inlet end of the extraction train and the over-all amount of coffee and volume of water used are so regulated as to produce an extract containing at least 40 percent by weight of soluble coffee solids representing between 28 and 40 percent by weight of the coffee extracted.

7. In a process for preparing a concentrated aqueous infusion of ground roasted coffee adapted to be used for the preparation of a concentrated soluble coffee product, in which process hot water is passed serially through a plurality of percolators containing ground roasted coffee in a series of progressively less exhausted stages of extraction in the direction of travel of the water, the steps which comprise: passing liquid water in the temperature range of 125°–150° C. into contact with ground roasted coffee in a series of extraction stages in which the coffee is progressively less exhausted in the direction of flow of the water until the water has formed an infusion containing in solution 8 to 12 percent by weight of coffee solids, passing the resultant infusion into contact with coffee in a further series of extraction stages in which the coffee is progressively less exhausted in the direction of flow of the infusion until the infusion contains in solution at least 35 percent by weight of coffee solids while permitting the temperature of the infusion to fall below 50° C. but not as low as 25° C., cooling the resulting infusion to a temperature in the range 25°–15° C., and passing it into contact with unextracted ground roasted coffee until it contains in solution at least 40 percent by weight of coffee solids, air being substantially excluded from contact with the infusion and with the coffee at all stages of the extraction.

8. In a process for preparing a cencentrated aqueous infusion of ground roasted coffee adapted to be used for the preparation of a concentrated soluble coffee product, in which process hot water is passed serially through a plurality of percolators containing ground roasted coffee in a series of progressively less exhausted stages of extraction in the direction of travel of the water, the steps which comprise: extracting partially exhausted ground roasted coffee with liquid water in the temperature range 125°–150° C. until the water has acquired a soluble solids content in the range 8–12 percent by weight, extracting partially but less exhausted ground roasted coffee with the resulting infusion at temperatures in the range below that of the previous extraction but about 25° C. until the infusion has acquired a soluble solids content of at least 35 percent by weight, extracting unextracted coffee with resulting infusion at a temperature in the range 25°–15° C. until it has acquired a soluble solids content of at least 40 percent by weight, and throughout the operation excluding air from contact with the infusion and with the ground roasted coffee undergoing extraction.

JOHN ORNFELT.

REFERENCES CITED

The following references are of record in the file of this patent:

UNITED STATES PATENTS

| Number | Name | Date |
|---|---|---|
| 617,322 | Duke | Jan. 10, 1899 |
| 1,393,045 | Scott | Oct. 11, 1921 |
| 1,687,112 | Slocum et al. | Oct. 9, 1928 |
| 1,891,383 | Giffen et al. | Dec. 20, 1932 |
| 2,324,526 | Morgenthaler | July 20, 1943 |
| 2,333,027 | Morgenthaler | Oct. 26, 1943 |